FERROMAGNETIC FILM

Filed July 14, 1966

INVENTOR
KIE Y. AHN

BY [signature]
ATTORNEY

United States Patent Office 3,519,498
Patented July 7, 1970

3,519,498

FERROMAGNETIC FILM

Kie Y. Ahn, Bedford, N.Y., assignor to International Business Machines Corporation, Armonk, N.Y., a corporation of New York Filed July 14, 1966, Ser. No. 565,181
Int. Cl. H01f *1/14;* C21d *1/04;* C22c *19/00*
U.S. Cl. 148—31.55 3 Claims

ABSTRACT OF THE DISCLOSURE

The quality factor $$\frac{H_c}{\alpha.H_k}$$

of a ferromagnetic film having uniaxial anisotropy is controllably altered by homogeneously dispersing silver therein. By coevaporating nickel, iron and silver in weight relationship of Ni:Fe:Ag of approximately 81:19:4 to 81:19:6, the resulting ferromagnetic film has a quality factor wherein $H_c$ is controllably altered dependent upon the amount of included sliver and the product $\alpha.H_k$ is not changed. The ferromagnetic film has realtively larger coercive force along the easy axis than the film without Ag present. Further, the film has zero magnetostriction and substantially zero crystalline anistropy.

This invention relates generally to ferromagnetic films, and it relates more particularly to ferromagnetic films having relatively high coercivity including nickel and iron as components.

Several compositions of nickel and iron have been utilized beneficially in the prior art for ferromagnetic films with both easy and hard axes. An indicative parameter of such films for practical applications is the quality factor $$\frac{H_c}{\alpha.H_k}$$

where $H_c$ is the coercive force along the easy axis, $H_k$ is the anisotropy field along the hard axis and $\alpha$ is the angular dispersion, i.e., the angular deviation of local anisotropy from the macroscopic easy axis. It is desirable for many practical applications of magnetic films in computer technology that the easy axis coercive force $H_c$ be altered controllably in a particular film without significant change in the product $\alpha.H_k$. As $H_k$ is effectively a constant parameter under certain circumstances, the parameter $\alpha$ is a measure of the attainment of controlled alteration of $H_c$.

The composition 83% Ni, 17% Fe by weight is used extensively in bulk configurations of magnetic materials. Several dopant materials have been used to modify the magnetic charactistics of comopsitions constituted mainly of nickel and iron. Important characteristics of the 83% Ni, 17% Fe composition are its zero magnetostriction and substantially zero crystalline anisotropy. Various compositions of nickel and iron which are relatively similar numerically to the 83% Ni, 17% Fe composition also have low magnetostriction and low crystalline anisotropy.

The induced uniaxial anisotropy acts in such a way that the magnetization tends to be directed along a certain direction termed the easy axis. The direction along which it is difficult to magnetize the film is called the hard direction. An expenditure of a particular amount of energy is required to magnetize a crystal to saturation in a hard direction compared to the lower energy required to saturate along a direction of easy magnetization. The excess energy required in the hard direction is the crystalline anisotropy energy.

Magnetostriction arises physically from the dependence of the crystalline anisotropy energy on the state of the strain of the crystal lattice. The length of a crystal in a single direction relative to the crystal axes in ferromagnetic single crystals depends on the direction of the magnetization relative to the crystal axes. It may be energetically favorable for the crystal to deform slightly from the normal crystalline condition if doing so lowers the anisotropy energy by more than the elastic energy is raised.

It is an object of this invention to provide a ferromagnetic film including a nickel iron composition with predetermined coercive force along the easy axis.

It is another object of this invention to provide a ferromagnetic film having a composition including nickel and iron with a relatively high coercive force along the easy axis relative to the coercive force of a composition of nickel and iron alone.

It is another object of this invention to provide a ferromagnetic film having a composition including nickel and iron with a selected dopant dispersed therein to obtain a uniaxial anisotropy and low angular dispersion.

It is another object of this invention to provide a ferromagnetic film having a composition including nickel, iron, and silver, with zero magnetostriction and zero crystalline anisotropy.

It is another object of this invention to provide a ferromagnetic film having a composition including nickel and iron with approximately between 4% and 6% silver by weight dispersed therein.

It is another object of this invention to provide a ferromagnetic film having a homogeneous composition obtained by codeposition of Ni:Fe:Ag in weight relationship 81:19:6.

The foregoing and other objects, features and advantages of the invention will be apparent from the following more particular description of a preferred embodiment of the invention, as illustrated in the accompanying drawings.

It has been discovered for the practice of this invention that the quality factor $$\frac{H_c}{\alpha.H_k}$$

of a ferromagnetic film can be controllably altered by homogeneously dispersing silver therein. The 83% Ni, 17% Fe composition as a bulk ferromagnetic material, has zero magnetostriction and substantially zero crystalline anisotropy. Comparable magnetic parameters are present in the film form if the composition is 81% Ni, 19% Fe. By coevaporation of nickel and iron from bulk ferromagnetic material having a composition 83% Ni, 17% Fe the resultant film obtained by deposition on a substrate held at a temperature 200° C.–300 C. is 81% Ni, 19% Fe as a result of fractionation. Illustratively, by coevaporating nickel, iron, and silver in weight relationship Ni:Fe:Ag=81:18:4–6, the resulting ferromagnetic film has a quality factor wherein $H_c$ is controllably altered dependent upon the amount of included silver and the product $\alpha.H_k$ is not changed.

It is desiraable and important that $\alpha.H_k$ not be changed by the inclusion of the silver. Film memory devices require a large quality factor in order not to be disturbed by neighboring information bits. This may be achieved by raising $H_c$ and keeping $\alpha.H_k$ the same. 81% Ni, 19% Fe, when deposited in the presence of a magnetic field lying in the plane of deposition, is anisotropic and differs significantly in its magnetic properties from the comparable bulk composition 83% Ni, 17% Fe. There are present both the easy axis and the hard axis in the plane, whereas the bulk ferromagnetic material is usually isotropic. To the extent that magnetic anisotropy may be present in bulk ferromagnetic materials, it usually is attendant shape anisotropy. In contrast, for ferromagnetic films in accordance with this invention, the anisotropy is relative to an easy axis and a hard axis, i.e. there is present uniaxial anisotropy.

The premise of this invention will be further described with reference to the drawings.

Figure 1:
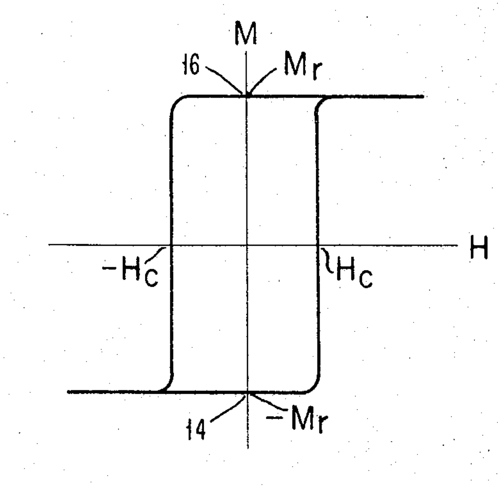
FIG. 1 is a line diagram showing a rectangular hysteresis loop exemplary for the easy axis of a ferromagnetic film in accordance with the practice of this invention.
Figure 2:
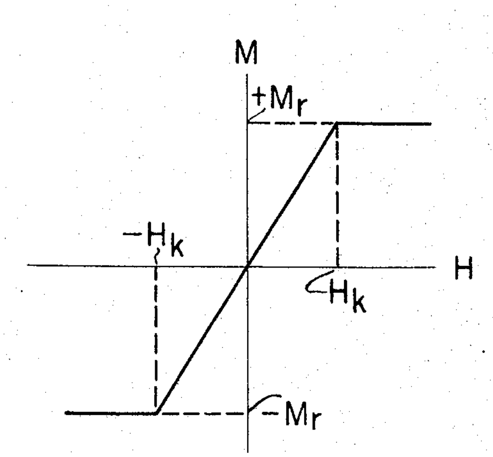
FIG. 2 is a hysteresis loop showing the anisotropy field $H_k$ for the hard axis of a ferromagnetic film in accordance with the practice of this invention.

In FIG. 1, the rectangular hysteresis loop 10 set forth with respect to the horizontal axis field H and the vertical axis magnetization M has positive and negative coercive forces $H_c$ and $-H_c$. The coercive force measures an important criterion in the selection of ferromagnetic materials for practical applications. It is a measure of the strength of the magnetic field required to change the state of magnetization, e.g., from remanent state $-M_r$ identified as point 14 to remanent state $M_r$ identified by point 16. In FIG. 2, which is representative of the hysteresis curve for the hard axis of a ferromagnetic film in accordance with this invention, the positive and negative anisotropy fields are $H_k$ and $-H_k$.

Figure 3:
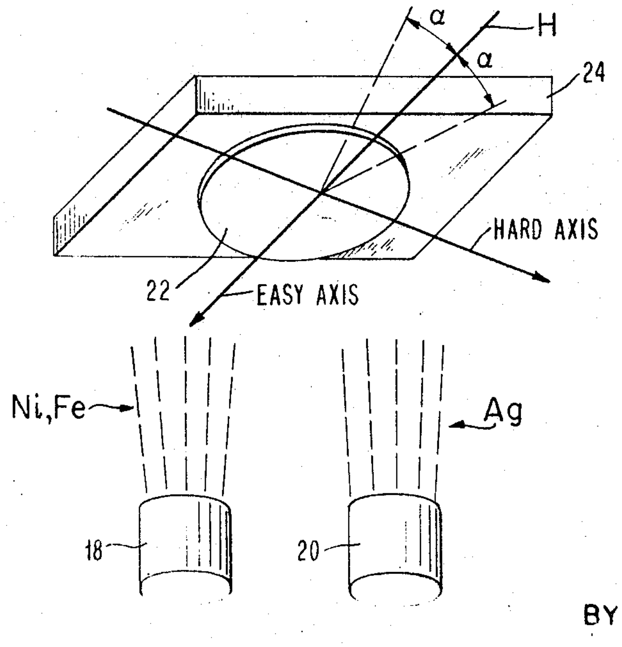
FIG. 3 is a schematic diagram illustrating the technique of coevaporation of nickel, iron, and silver onto a substrate to obtain a ferromagnetic film in accordance with the practice of this invention.

With reference to FIG. 3, bulk composition having 83% Ni, 17% Fe is established in crucible 18 and vacuum evaporated therefrom by addition of heat, e.g., by induction heating or electron bombarding in accordance with conventional techniques, and Ag is similarly evaporated from crucible 20. The resultant film 22 is deposited on a substrate 24 which may conveniently be glass, or quartz, or metallic plates with smooth surfaces. Exemplary thickness of film 22 is 2000 Angstrom units. The temperature of the substrate 24 is at approximatly 200° C.–300° C. during the deposition process. A magnetic field having an intensity H is established in the plane of the ferromagnetic film 22 during the deposition thereof and determines the direction of the easy axis.

The magnetic field in the plane of the ferromagnetic film 22 for establishing the easy axis and the hard axis therein, must effectively be at least 30 oersteds. The hard axis also lies in the plane of the film and is perpendicular to the easy axis. A convenient parameter of a ferromagnetic film is the solid angle $2\alpha$ which is indicative that 90% of the local ferromagnetic anisotropy is directed at least within it.

The following table is exemplary of experimental results which verify the discovery hereof for the practice of this invention that silver controllably dispersed in a composition of nickel and iron at weight proportion Ni:Fe:Ag=81:19:6 beneficially increases the coercive force $H_c$ for the easy axis but does not substantially alter either the angular dispersion nor the anisotropy field for the hard axis.

TABLE

| Ag | $H_c$ | $H_k$ | $\alpha$ |
|---|---|---|---|
| 0% | 1.2–1.4 oe. | 3.4–3.5 oe. | 1° |
| 6% | 2.4–2.6 oe. | 3.5–3.7 oe. | 1° |

The exemplary range of silver present by weight in a film for the practice of this invention has been set forth as Ni:Fe:Ag=81:19:4–6. Although an optimum improvement in coercive force along the easy axis is obtained with no change in the product $\alpha.H_k$ in the quality factor $$\frac{H_c}{\alpha.H_k}$$

slight departures from the range by weight silver set forth still provides satisfactory ferromagnetic films by the practice of this invention, e.g., approximately between 3% to 7% Ag by weight is satisfactory, i.e., both the magnetostriction and crystalline anisotropy are nearly zero in the resulting ferromagnetic film.

A ferromagnetic film in accordance with this invention may have various thicknesses. Desirable results have been obtained with films having thicknesses between 1000 Angstrom units and 2000 Angstrom units, but departures from this range are permitted for the practice of this invention. The basic criterion for the thickness is that there be present the film property of anisotropy field $H_k$.

The practice of this invention has been presented above by describing vacuum coevaporation of nickel and iron from one source and silver from another. Alternatively, sputtering of a ternary alloy Ni:Fe:Ag=81:19:4–6 by weight provides equivalent results. Sputtering is the removal of atoms from a cathode by bombardment thereof by charged particles.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A ferromagnetic thin film having uniaxial anisotropy with an easy axis and a hard axis and including
   composition by weight of 81 parts of Ni, 19 parts of Fe and Ag in the range of approximately 4 parts to 6 parts,
   said thin film having the properties of zero magnetostriction and substantially zero crystalline anisotropy,
   relatively larger coercive force along said easy axis than said film without Ag present, and
   relatively small permeability along said hard axis and relatively large permeability along said easy axis.

2. A ferromagnetic thin film having uniaxial anisotropy with an easy axis and a hard axis and including
   composition by weight of 81 parts of Ni, 19 parts of Fe and approximately 6 parts of Ag,
   said thin film having the properties of zero magnetostriction and substantially zero crystalline anisotropy,
   relatively larger coercive force along said easy axis than said film without Ag present, and
   relatively small permeability along said hard axis and relatively large permeability along said easy axis.

3. A ferromagnetic thin film having uniaxial anisotropy with an easy axis and a hard axis, and including
   composition by weight of 81 parts of Ni, 19 parts of Fe and less than 7 parts of Ag but more than 3 parts of Ag,
   said thin film having the properties of nearly zero magnetostriction and nearly zero crystalline anisotropy,
   relatively larger coercive force along said easy axis than said film without Ag present, and
   relatively small permeability along said hard axis and relatively large permeability along said easy axis.

References Cited

UNITED STATES PATENTS

| | | | |
|---|---|---|---|
| 1,838,130 | 12/1931 | Beckinsale | 75—170 |
| 1,873,155 | 8/1932 | Scharnow | 148—31.55 |
| 3,102,048 | 8/1963 | Gran et al. | 117—238 XR |
| 3,117,896 | 1/1964 | Chu et al. | 148—108 |
| 3,124,490 | 3/1964 | Schmeckenbecher | 148—31.55 |
| 3,287,108 | 11/1966 | Hausner | 117—107 |
| 3,303,116 | 2/1967 | Maissel et al. | 117—238 XR |
| 3,399,129 | 8/1968 | Flur et al. | 204—192 |

L. DEWAYNE RUTLEDGE, Primary Examiner

G. K. WHITE, Assistant Examiner

U.S. Cl. X.R.

75—170; 148—108